US008557030B2

(12) United States Patent
Fornof et al.

(10) Patent No.: US 8,557,030 B2
(45) Date of Patent: Oct. 15, 2013

(54) AIR DRYER ASSEMBLY

(75) Inventors: William P. Fornof, Girard, PA (US);
Leonard A. Quinn, Lagrange, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 244 days.

(21) Appl. No.: 13/080,688

(22) Filed: Apr. 6, 2011

(65) Prior Publication Data

US 2012/0255437 A1 Oct. 11, 2012

(51) Int. Cl.
*B01D 53/02* (2006.01)

(52) U.S. Cl.
USPC ............ 96/134; 96/11; 96/12; 96/132; 95/45; 123/198 E

(58) Field of Classification Search
USPC .......... 95/45; 96/11, 12, 132, 134; 123/198 E
See application file for complete search history.

(56) References Cited

U.S. PATENT DOCUMENTS

| | | | |
|---|---|---|---|
| 2,626,675 | A | 1/1953 | Maher |
| 3,464,186 | A | 9/1969 | Hankison |
| 3,691,251 | A | 9/1972 | Bauer |
| 4,364,756 | A | 12/1982 | Clarke |
| 4,372,847 | A | 2/1983 | Lewis |
| 4,487,617 | A | 12/1984 | Dienes |
| 5,427,609 | A * | 6/1995 | Zoglman et al. ................... 95/98 |
| 5,607,500 | A | 3/1997 | Shamine |
| 5,807,422 | A | 9/1998 | Grgich |
| 6,319,296 | B1 | 11/2001 | Fornof |
| 6,358,300 | B1 * | 3/2002 | Fornof et al. ..................... 95/91 |
| 6,723,154 | B2 | 4/2004 | Olsson |
| 6,951,581 | B2 | 10/2005 | Fornof |
| 7,097,696 | B2 | 8/2006 | Salzman |
| 7,625,436 | B2 | 12/2009 | Paling |
| 7,789,950 | B2 | 9/2010 | Hoffman |
| 2005/0235827 | A1 * | 10/2005 | Dinnage et al. ................. 95/113 |
| 2008/0289505 | A1 | 11/2008 | Milomo |
| 2009/0038476 | A1 | 2/2009 | Blackwood |

FOREIGN PATENT DOCUMENTS

WO WO2005051521 A1 6/2005

OTHER PUBLICATIONS

WABCO, Air System Protector Air Dryer Cartridge with Coalescing Filter, advertising literature, Jun. 2005, 3 pages.
Bendix Commercial Vehicle Systems LLC, Bendix AD-9 Air Dryer SD-08-2412, Service Data Sheet, Apr. 2008, 24 pages, Elyria Ohio, United States of America.
SKF Group, SKF Brakemaster Air Dryer Solutions, Brochure, Jan. 2010, 8 pages, United States of America.

* cited by examiner

*Primary Examiner* — Christopher P Jones
(74) *Attorney, Agent, or Firm* — Eugene E. Clair; Cheryl L. Greenly

(57) ABSTRACT

An air dryer cartridge assembly, used in a compressed air system, includes a rigid porous layer, a fibrous material layer, a diffusing layer and a desiccant for filtering and drying compressed air passing in a first direction during a charging cycle. The compressed air passes through diffusing layer, the fibrous material layer and the rigid porous layer in a second direction during a purging cycle. The desiccant, which is downstream of the rigid porous layer, the fibrous material layer and the diffusing layer during the charging cycle, reduces moisture in the compressed air during the charging cycle. The use of diffusing layer downstream of the fibrous material layer during a charging cycle disperses the compressed air so that moisture removal is improved in the desiccant.

24 Claims, 5 Drawing Sheets

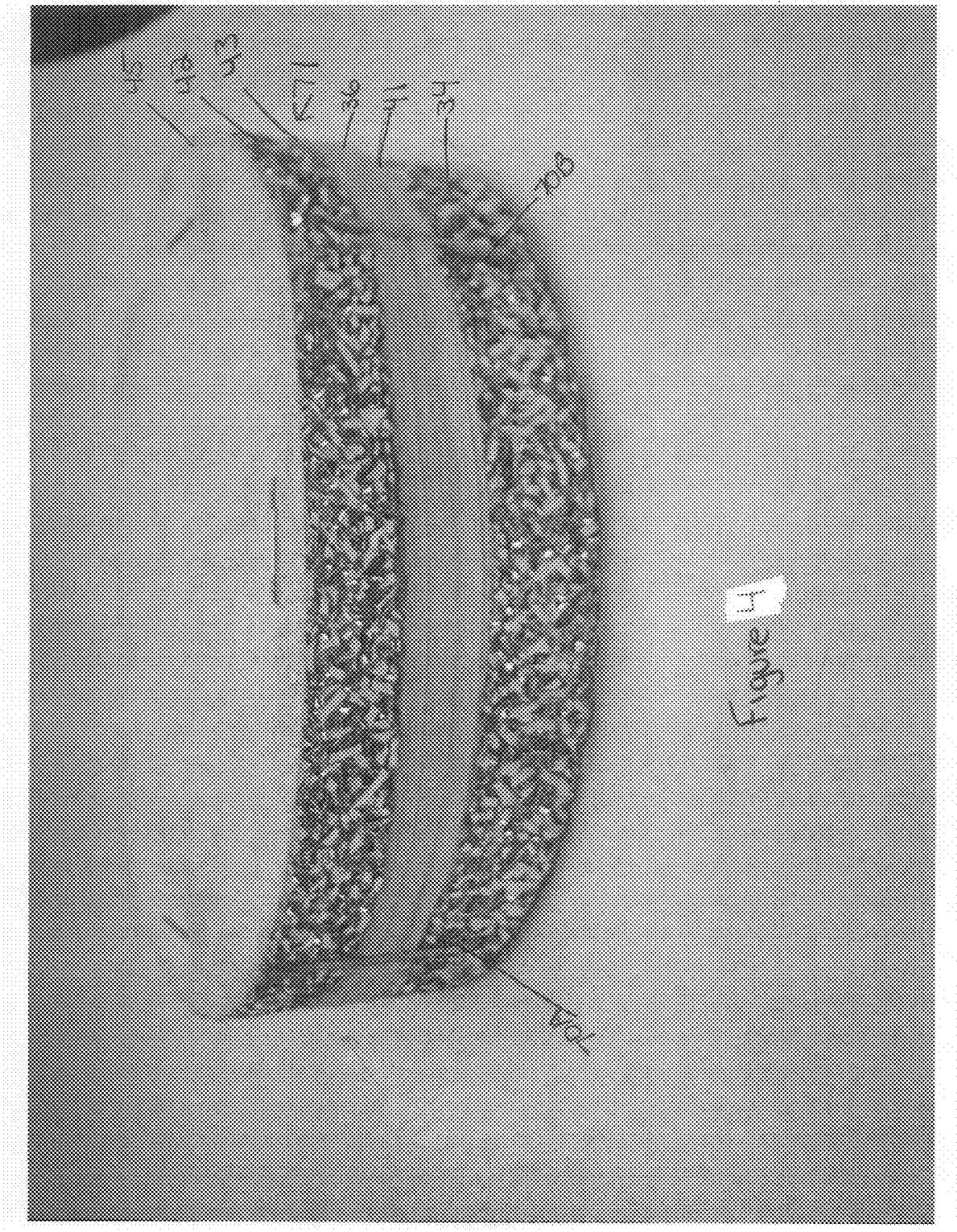

AIR DRYER ASSEMBLY

BACKGROUND

The present invention relates to an air dryer assembly for use in a compressed air system for heavy vehicles, locomotives and/or auxiliary devices that use compressed air. Typical heavy vehicle compressed air systems include a compressor for compressing the air, an air dryer assembly for removing moisture and contaminants from the compressed air, a reservoir for storing the compressed air and valves and other pneumatic system components for distributing the compressed air. The present invention finds particular application in conjunction with heavy vehicles that use compressed air to selectively control application of vehicle brakes and will be described with particular reference thereto.

The compressor provides compressed air to a reservoir, the pressure being used to operate vehicle brakes and other air operated systems associated with the vehicle. Ambient air is typically drawn into a compressor inlet for compression during an air delivery, or charging, cycle. The air brake compressor is typically supplied with oil in order to lubricate bearings and other components of the compressor.

Typically, the air dryer assembly is installed downstream from the compressor for reducing the moisture content of the compressed air. The air dryer assembly delivers substantially dry compressed air for braking system components, thereby increasing the service life of braking system components such as valves and pneumatic brake actuators. Providing clean dry compressed air to brake system components reduces maintenance costs. In some air dryers, a desiccant is used to adsorb water vapor as the compressed air passes through the air dryer assembly during a charging cycle. Liquid water and water vapor is adsorbed onto the desiccant. After a period of charging during normal operation, the desiccant becomes saturated with water and must be regenerated. The desiccant is regenerated through a purging cycle, which comprises passing dry, high pressure air in a reverse direction through the desiccant.

Moisture and particulates may exist in the ambient air entering the compressor during a charging cycle and subsequently pass through the compressor to the air dryer assembly. In addition, lubricating oil may become entrained as an aerosol in the compressed air stream exiting the compressor. The air dryer efficiency is adversely affected by the particulates and the oil that can be deposited on the surface of the desiccant, reducing the desiccant's ability to adsorb water vapor.

It is desirable to reduce contamination of the desiccant with oil by employing filtering elements that effectively reduce oil in the compressed air stream. One type of filter is an oil removal filter, where liquid oil adheres to the filter during a charging cycle. The filter releases the collected oil into an oil sump. A second type of filter is an oil coalescing filter which coalesces oil from an aerosol form to a liquid form. A coalescing filter can be used in combination with an oil removal filter so that the liquid oil is captured after the oil aerosol is converted to a liquid in the coalescing filter.

Some prior art air dryer assemblies have a filter downstream of the desiccant during a charging cycle, which allows the oil and particulates to pass into the desiccant before being removed from the compressed air stream. While a downstream filter will reduce contamination in brake system components, the desiccant in the air dryer assembly will still be fouled by any oil and particulates in the compressed air stream as described above. This will make the desiccant less effective at removing moisture. The Puraguard® QC oil coalescing filter by Bendix Commercial Vehicle Systems LLC is an example of a separate filtering device used in a compressed air system downstream of the air dryer assembly. An example of an air dryer assembly having an oil filter within the assembly and downstream of the desiccant is the WABCO® Air System Protector with integrated coalescing filter by Wabco Holdings Inc.

While it is preferred to remove the oil and particulates prior to the compressed air reaching the desiccant, certain types of internal filters upstream from the desiccant during a charging cycle, as well as certain configurations and combinations of filters, may cause channeling of the compressed air flow in the desiccant. Channeling occurs when definite narrow air flow passages form in the desiccant and the compressed air flow is substantially confined to these narrow passages rather than flowing freely throughout the entire volume of the desiccant. This compressed air flow channeling results in only a portion of the desiccant defined by these channels being in contact with the moisture laden compressed air stream, thereby reducing the effectiveness of the air dryer assembly in removing the liquid water or water vapor. One cause of the deleterious channeling may be the configuration of the filter or filters upstream of the desiccant, which forces the compressed air into channels within the filter elements as the filter captures the oil and particulates. The channels formed in the filter element remain and confine the compressed air flow as the compressed air passes into the desiccant, thereby concentrating the compressed air flow into certain areas of the desiccant and reducing water vapor removal efficiency. Another cause of channeling may be liquid oil that passes through the filter and is adsorbed onto the desiccant itself. In this situation, the oil can form channels in the desiccant as the oil fouls the desiccant, thereby inhibiting the desiccant's moisture removal ability. Another cause of channeling may be a high velocity of compressed air longitudinally through the filter. Another cause of channeling may be inadequate pressure drop across the desiccant.

For the foregoing reasons, there is a need for a new and improved apparatus and method to remove oil and particulate contaminants from the compressed air stream, which addresses the above-referenced problems.

SUMMARY

It is contemplated that an air dryer assembly used in a compressed air system according to at least one aspect of the present invention includes a filtering portion upstream of a desiccant during a charging cycle and downstream of the desiccant during a purging cycle. The filtering portion substantially removes contaminants in solid, liquid and vapor forms from the compressed air while reducing channeling in the desiccant. In one embodiment of an apparatus applying principles of the present invention, the filtering portion is contemplated as a rigid porous layer, a fibrous material layer, and a diffusing layer upstream of the desiccant during the charging cycle. The rigid porous layer upstream from the fibrous material layer collects oil and particulates in the solid form. The fibrous material layer coalesces the oil from an aerosol form to a liquid form for collecting the liquid oil. The diffusing layer, downstream from both the rigid porous layer and the fibrous material layer, diffuses the compressed air after it passes through the fibrous material layer. The diffused air passes substantially uniformly into the desiccant for improved moisture adsorption.

BRIEF DESCRIPTION OF THE DRAWINGS

The foregoing and other features and advantages of the present invention will become apparent to those skilled in the art to which the present invention relates upon consideration of the following detailed description of embodiments that apply principles of the present invention with reference to the accompanying drawings, wherein:

FIG. 4 illustrates a schematic representation of the filtering portion of an air dryer desiccant cartridge assembly illustrating features of the present invention.

DETAILED DESCRIPTION OF ILLUSTRATED EMBODIMENT

Figure 1:
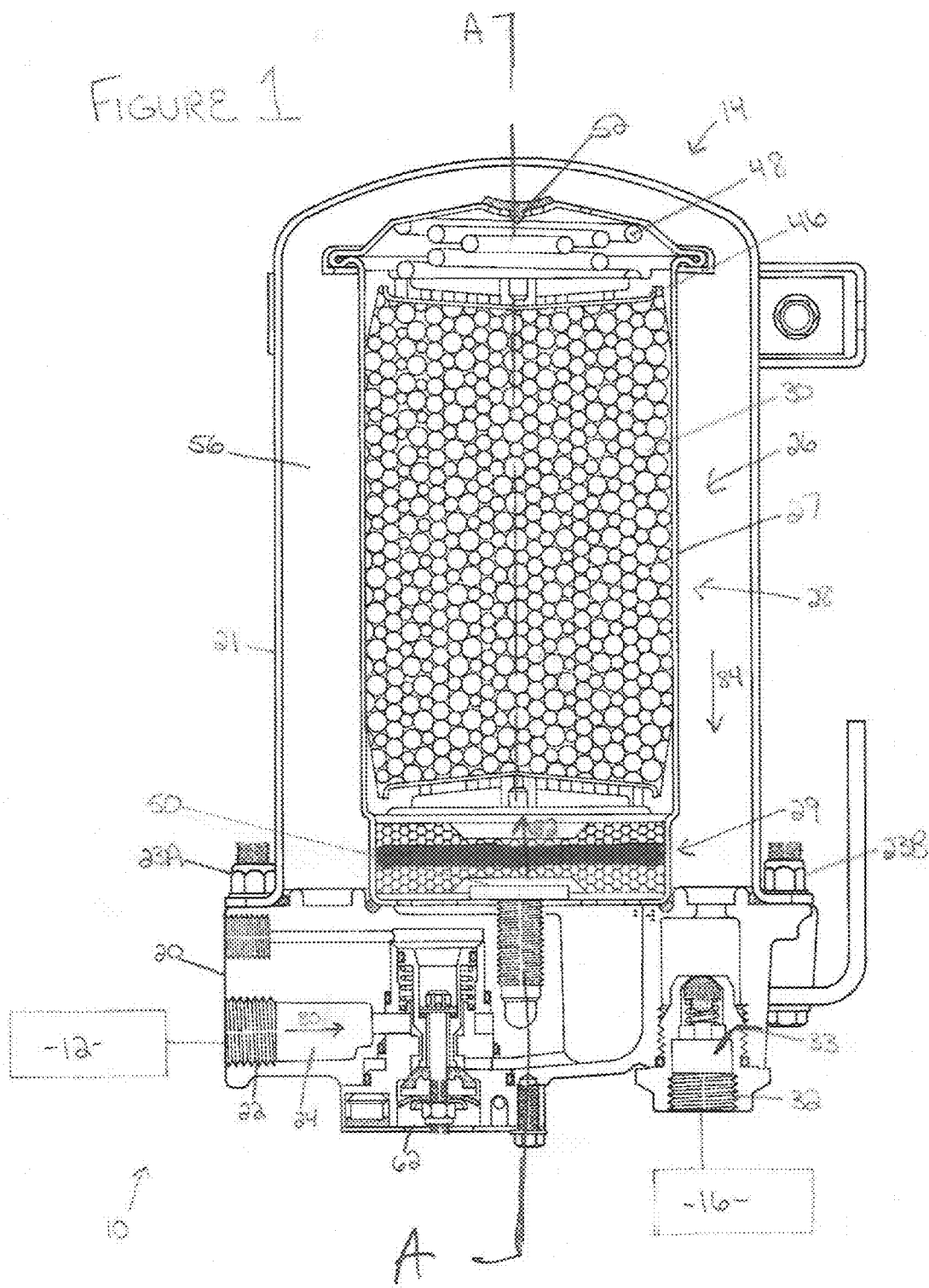
FIG. 1 illustrates a sectional schematic representation of an air dryer assembly illustrating features of the present invention.

With reference to FIG. 1, a compressed air system 10 includes a compressor 12, an air dryer assembly 14 and a reservoir 16. The compressor 12 is operatively connected to the air dryer assembly 14 for providing the air dryer assembly with compressed air. The air dryer assembly 14 provides dry clean compressed air to the reservoir 16 to operate various pneumatic systems on a commercial vehicle.

The air dryer assembly 14 includes an end cover 20, a replaceable desiccant cartridge assembly 26 and an outer shell 21. The end cover 20 includes a plurality of ports, passages and valve components for receiving, delivering and controlling compressed air flow in the air dryer assembly 14. For example, the end cover 20 includes a supply port 22 for receiving the compressed air from the compressor 12. A supply passage 24 is defined in the end cover 20 adjacent to the supply port 22. The supply passage 24 is the conduit for the compressed air between the supply port 22 and the desiccant cartridge assembly 26. A delivery passage 33 is defined in the end cover 20 and is the conduit for the clean dry air from the desiccant cartridge assembly 26 to a delivery port 32. The delivery port 32 for delivering compressed air to the reservoir 16 is adjacent to the delivery passage 33. The specific fluid passages connecting the supply passage 24 and the delivery passage 33 to the desiccant cartridge assembly 26 are not shown. The end cover 20 also includes a purge port 62 for communicating with atmosphere when the desiccant cartridge assembly 26 is being regenerated.

The end cover 20 is configured to securely receive the replaceable desiccant cartridge assembly 26. The desiccant cartridge assembly 26 includes a cylindrical body 27 having a generally central longitudinal axis A-A. An inlet 50 is located at a first end of the body 27. The inlet 50 is pneumatically connected to the supply passage 24. The body 27 includes a cylindrical filtering portion 29 adjacent to the inlet 50 and located along the axis A-A. A drying portion 28 having a desiccant 30 is located between the filtering portion 29 and a spring 48 in the body 27. The spring 48 contacts a perforated metal plate 46 which contacts the desiccant 30. The spring 48 applies a force to the desiccant 30 to prevent damage to the desiccant 30 due to vibration of the air dryer assembly 14. The drying portion 28 is generally centered along a same longitudinal axis A-A as the filtering portion 29. The drying portion 28 includes a suitable volume of desiccant 30 to effectively remove moisture from the compressed air for operation of the pneumatic systems on the commercial vehicle. The body 27 includes an outlet 52 in a second end opposite the first end.

The end cover 20 is configured to securely receive the outer shell 21. The outer shell 21 surrounds the desiccant cartridge assembly 26 and has a diameter greater than the body 27 so as to adequately define a purge volume 56. The outer shell 21 is securely attached to the end cover 20 by a plurality of nuts and bolts. Two of the nut and bolt combinations 23a and 23b are depicted in FIG. 1. The desiccant cartridge assembly 26 is located generally centrally within the purge volume 56 of the air dryer assembly 14. The desiccant cartridge assembly 26 is pneumatically connected to the purge volume 56 through the outlet 52.

Figure 2:
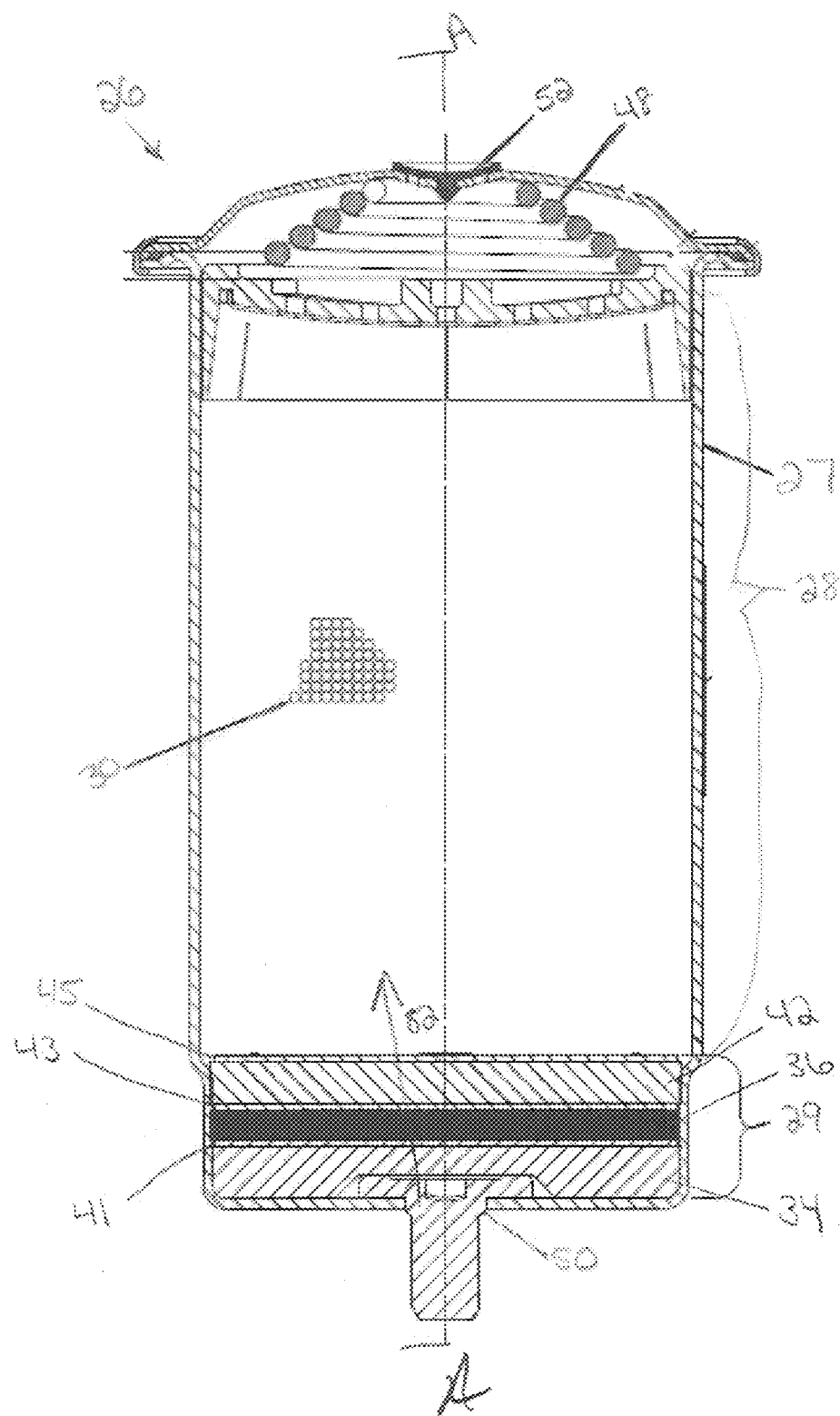
FIG. 2 illustrates a sectional schematic representation of an air dryer desiccant cartridge assembly illustrating features of the present invention.

Referring now to FIG. 2, the filtering portion 29 of the desiccant cartridge assembly 26 includes a rigid porous layer 34, a fibrous material layer 36, and a rigid diffusing layer 42. It is contemplated that each layer is a generally disc shaped element with a diameter that does not exceed the inner diameter of the body 27. The filtering portion 29 is contained within the body 27.

The rigid porous layer 34 is adjacent to the inlet 50. It is contemplated that the rigid porous layer 34 is an expanded metal foil of a general disc shape with a generally diamond shaped interlay. However other materials and different geometric shapes that separate oil droplets from the compressed air stream due to their ability to collect oil on the material surface are contemplated. Examples of alternative materials include, but are not limited to, crushed aluminum, ceramic, cellular plastic, coarse fibrous material, felt or alumina ball.

The fibrous material layer 36 is adjacent to the rigid porous layer 34. It is contemplated that the fibrous material layer 36 is a coalescing media, such as glass fiber material HE-1021 from the Hollingsworth and Vose Company in Massachusetts. However, other materials that coalesce oil from an aerosol form into oil droplets are also contemplated. These alternate materials include, but are not limited to, crushed aluminum, porous ceramic, membrane and micro-cellulose.

Figure 3A:
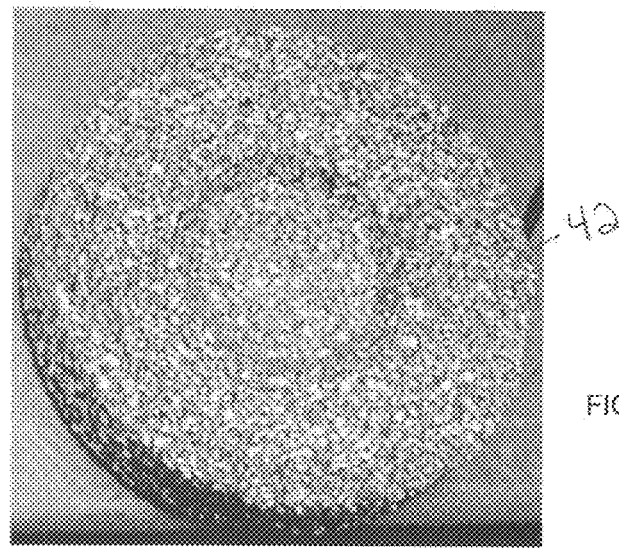
FIGS. 3A, 3B and 3C illustrate representations of alternate embodiments of a rigid diffusing layer according to the features of the present invention.
Figure 3B:
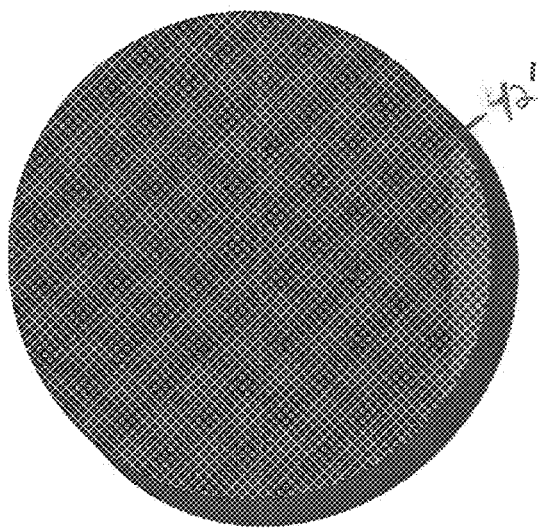
Figure 3C:
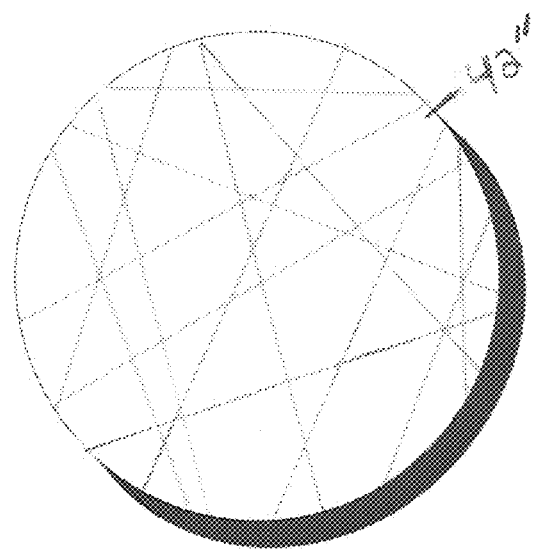

The rigid diffusing layer 42 is positioned between the fibrous material layer 36 and the desiccant 30. FIG. 3A depicts the rigid diffusing layer 42 as an expanded metal foil material with the diamond shaped interlay, similar in composition to that of the rigid porous layer 34. The material of the rigid diffusing layer 42 can be metallic or non-metallic. The structure of the rigid diffusing layer 42' is also contemplated as a grid, as shown in FIG. 3B. An assembly consisting of non-uniform geometric shapes can also be used as the rigid diffusing layer 42", as shown in FIG. 3C. The non-uniform geometric structure of the rigid diffusing layer 42" is contemplated such that there are multiple pathways for the compressed air to travel through and expand into before reaching the desiccant 30.

The rigid porous layer 34 and the fibrous material layer 36 are separated by a first permeable material 41. A second permeable material 43 separates the rigid diffusing layer 42 from the fibrous material layer 36. A third permeable material 45 separates the rigid diffusing layer 42 from the desiccant 30. However, alternate designs may have a permeable material between one, two or none of the layers. The permeable materials 41, 43, and 45 may be, but are not required to be, made of the same material and are permeable to at least water and air molecules. It is contemplated that at least one of the permeable materials is polypropylene.

With reference to FIG. 4, a filtering assembly 71 is shown for use as the filtering portion 29 in the desiccant cartridge 26. The filtering assembly 71 includes the rigid porous layer 34, the first permeable material 41, the fibrous material layer 36, the second permeable material 43, the rigid diffusing layer 42 and the third permeable material 45. A thickness of less than 0.25 inches for the rigid porous layer 34 and less than 0.25 inches for the fibrous material layer 36 would decrease the oil removal capability of the filtering assembly 71. The overall thickness of the entire filtering assembly 71 is between 1.4 and 1.6 inches, with the preferred thickness being 1.5 inches. The preferred overall thickness is such that an adequate amount of desiccant 30 can be loaded into the drying portion 28. In addition, the preferred thickness of the filtering assembly provides the proper compression of the fibrous material layer 36 when the preferred amount of desiccant 30 is loaded into the drying portion 28.

The single filtering assembly 71 is held together by at least two staples 70a and 70b. The bodies of the at least two staples 70a and 70b are affixed along the outer perimeter of the filtering assembly 71. The prongs of the at least two staples 70a and 70b are generally radially inserted into the rigid porous layer 34 and the rigid diffusing layer 42. With the addition of the at least two staples 70a and 70b, the filtering assembly 71 can be inserted or removed from the desiccant cartridge assembly 26 as a single piece. For uniform holding of the filtering assembly 71, it is contemplated that three staples are located uniformly around the circumference of the filtering assembly 71 to hold the filtering assembly 71 together. Other means of holding the filtering assembly 71 together that would not affect air flow through the layers include stitching, wiring or caging.

Referring to FIG. 1, the air dryer assembly 14 operates in two different modes. The first mode of operation is a charging cycle and the second mode of operation is a purging cycle. During the charging cycle, ambient air is compressed by the compressor 12. The air dryer assembly 14 receives the compressed air at the supply port 22. The air dryer assembly 14 treats the compressed air by substantially removing moisture, oil vapor and particulates from the compressed air. After treatment, the compressed air is sent via the delivery port 32 to the reservoir 16, where it is stored for use by various vehicle pneumatic systems requiring compressed air, for example an air brake system on a commercial vehicle.

With respect to the air dryer assembly 14, the compressed air flows through the supply passage 24 in a direction of the illustrated arrow 80 during the charging cycle. The compressed air flows from the supply passage 24 to the filtering portion 29 of the desiccant cartridge assembly 26 through the inlet 50 in the body 27 in a direction of the illustrated arrow 82.

Referring to FIG. 2, the compressed air flows through the rigid porous layer 34, which separates liquid oil from the compressed air. Once the liquid oil is reduced in the compressed air, the compressed air then passes through the first permeable material 41. Next, the compressed air passes through the fibrous material layer 36, which agglomerates, or coalesces, the oil in an aerosol form in the compressed air into larger droplets (e.g. liquid oil). However, because of the configuration of the fibrous material layer 36 and the compression of the fibrous material layer 36, the compressed air may form channels as the air passes through the fibrous material layer 36. The compressed air containing the agglomerated oil then passes through the second permeable material 43 and through the rigid diffusing layer 42. In the rigid diffusing layer 42, the compressed air has the opportunity to diffuse, expand and achieve a lower velocity. By diffusing, or dispersing, the air stream before the air enters the desiccant 30 the air flow is in contact with substantially more of the desiccant 30 and is less likely to form into narrow channels that reduce the effectiveness of the desiccant in removing moisture from the compressed air. If the rigid diffusing layer 42 is an expanded aluminum foil or similar material, the rigid diffusing layer 42 further reduces the amount of oil in the compressed air while still providing the desired diffusion of air. Consequently, the compressed air entering the desiccant 30 is substantially evenly distributed and includes significantly less oil than the compressed air entering the filtering portion 29.

The compressed air passes through the third permeable layer 45 and enters the desiccant 30. During the charging cycle, the desiccant 30 is located downstream of the rigid porous layer 34, the fibrous material layer 36 and the rigid diffusing layer 42. As the compressed air passes through the desiccant 30, moisture in the compressed air is adsorbed by the desiccant 30. The spring 48 axially compresses the desiccant 30 such that the desiccant 30 does not move within the drying material portion 28. If the desiccant 30 is allowed to move within the desiccant cartridge assembly 26, the movement of desiccant 30 against itself can develop a fine powder, thereby reducing the efficiency of the desiccant 30. The spring 48 also compresses the rigid diffusing layer 42, the fibrous material layer 36 and the rigid porous layer 34 within the desiccant cartridge assembly 26. It is contemplated that the axial compression at the fibrous material layer 36 is between 20 pounds per square foot and 30 pounds per square foot, with the preferred compression being twenty-five (25) pounds per square foot.

Axial compression of the fibrous material layer 36 improves the oil removal capability of the fibrous material layer 36 but lowers the pressure drop across the fibrous material layer 36. It is desired that an adequate higher pressure drop be maintained through the desiccant 30 and filtering portion 29 to maintain oil and moisture reduction capabilities of the air dryer assembly 14. The rigid diffusing layer 42 also serves to advantageously increase the pressure drop across the filtering portion 29 by increasing the distance the compressed air must travel between the fibrous material layer 36 and the desiccant 30.

The substantially dried and filtered air exits the desiccant cartridge assembly 26 through the outlet 52 in the body 27. Referring to FIG. 1, the air exiting the desiccant cartridge assembly 26 then enters the purge volume 56 in the direction shown by arrow 84. The purge volume 56 is bounded by the outer shell 21 and substantially surrounds the desiccant cartridge assembly 26. During a purge cycle, the air in the purge volume 56 is used to regenerate the moisture removing capacity of the desiccant 30. During a charging cycle, the purge volume acts as a passage to provide clean dry compressed air to the delivery passage 33 as the compressed air exits the purge volume 56.

During the purging cycle, the compressed air flows in the reverse direction than that indicated by arrows 80, 82 and 84. The previously filtered and dried compressed air contained in the purge volume 56 is provided to the desiccant 30 through the outlet 52 in the body 27. The purge air removes adsorbed moisture from the desiccant 30. During the purging cycle, the desiccant 30 is upstream of the rigid diffusing layer 42, the rigid porous layer 34 and the fibrous material layer 36. From the desiccant 30, the purge air flows through the diffusing layer 42, the fibrous material layer 36, and the rigid porous layer 34. The purge also removes a portion of the oil in the rigid porous layer 34 and the fibrous material layer 36 before exiting the air dryer assembly 14 through the purge port 62.

Figure 5:
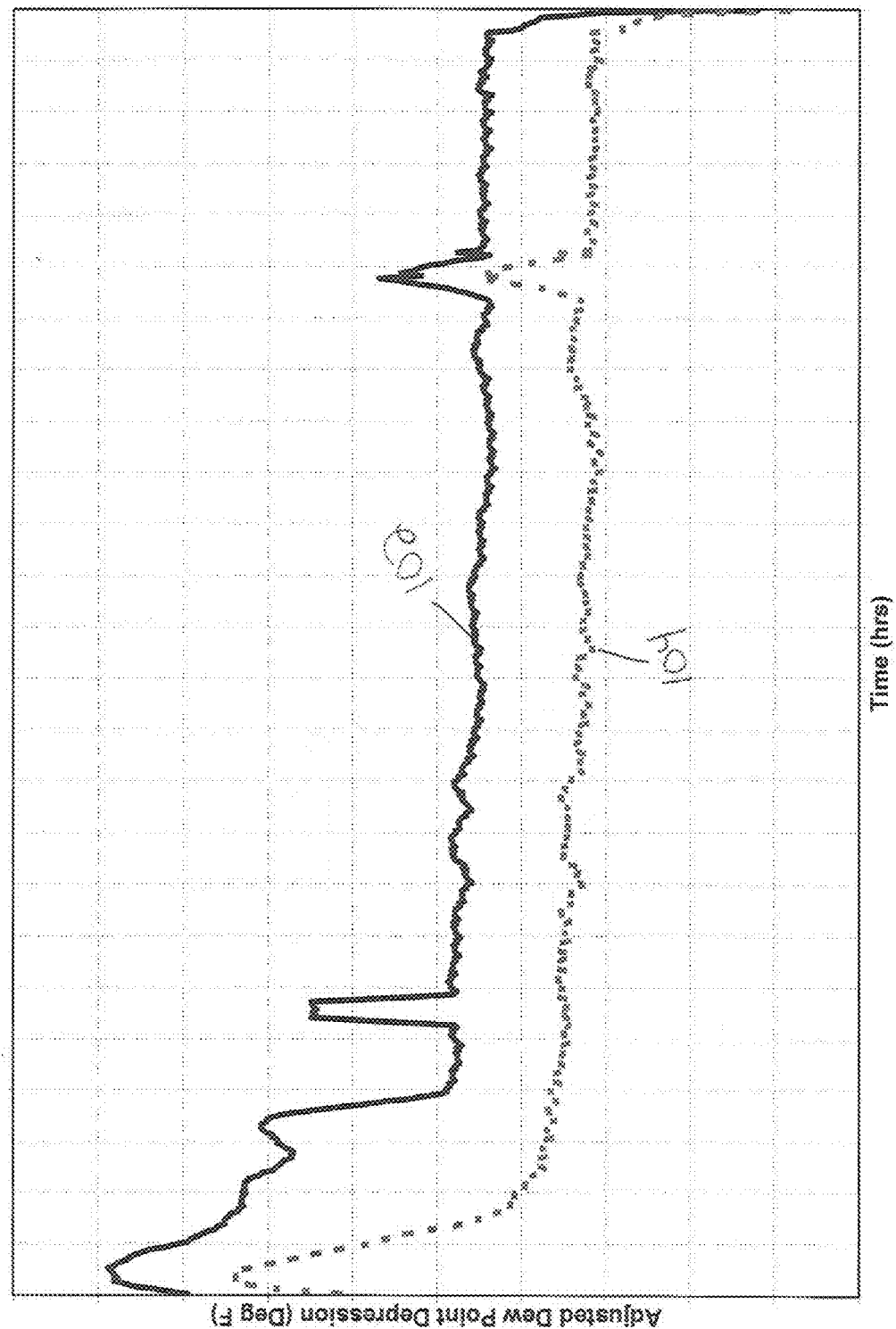
FIG. 5 is a graph illustrating an adjusted dew point depression over time with respect to a first air dryer embodying aspects of the present invention and a second air dryer that does not apply aspects of the present invention.

Using the arrangement of the present invention, measurable improvement can be realized in the adjusted dew point depression of an air dryer using the present filtering portion 29 having a rigid diffusing layer 42. As shown in FIG. 5, performance graph 102 shows an adjusted dew point depression over time for a first air dryer with a filter assembly according to the present invention. A second performance graph 104 shows an adjusted dew point depression over time for a second air dryer without aspects of the present invention, the second air dryer having only an oil separator element and a coalescing element, but not a diffusing layer. Both air dryers were repeatedly cycled for over 400 hours using the same compressed air source having the same duration charging and purging cycles. The dew point was measured by a hygrometer attached to the delivery ports of each of the first and second air dryers. The adjusted dew point depression over time of the first air dryer as shown in performance graph 102 with the present arrangement of the rigid porous layer 34, the fibrous material layer 36 and the rigid diffusing layer 42 averaged fifteen degrees Fahrenheit higher than the adjusted dew point depression as shown in performance graph 104 for the second air dryer without the diffusing layer. An air dryer with a higher adjusted dew point depression rating can adsorb more moisture before replacement of the dryer desiccant cartridge is necessary.

While the present invention has been illustrated by the description of embodiments described above, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

We claim:

1. An air dryer desiccant cartridge assembly comprising:
   a) a body having an inlet in a first end and an outlet in an opposite second end;
   b) a filtering portion in the body adjacent to the inlet comprising:
      i) a rigid porous layer adjacent to the inlet;
      ii) a fibrous material layer adjacent to the rigid porous layer;
      iii) a first permeable material for separating the fibrous material layer from the rigid porous layer;
      iv) a rigid diffusing layer adjacent to the fibrous material layer;
      v) a second permeable material for separating the rigid diffusing layer from the fibrous material layer;
      vi) a third permeable material for separating the rigid diffusing layer from a desiccant; wherein the rigid porous layer, the first permeable material, the fibrous material layer, the second permeable material, the rigid diffusing layer and the third permeable material are held together as a single assembly by at least two staples, the prongs of the at least two staples generally radially inserted into the rigid porous layer and the rigid diffusing layer; and
   c) the desiccant in the body between the rigid diffusing layer and the outlet, wherein during a charging cycle compressed air enters the body through the inlet and passes sequentially through the rigid porous layer, the fibrous material layer, the rigid diffusing layer and the desiccant before exiting through the outlet; and wherein the filtering portion and the desiccant are under compression.

2. The air dryer desiccant cartridge assembly as set forth in claim 1, wherein at least one of the first permeable material, second permeable material and third permeable material is a polypropylene material.

3. The air dryer desiccant cartridge assembly as set forth in claim 1, wherein the rigid porous layer is a material comprising at least one of crushed aluminum, ceramic, cellular plastic, expanded metal foil, coarse fiber, felt and alumina ball.

4. The air dryer desiccant cartridge assembly as set forth in claim 1, wherein the fibrous material layer is a material comprising at least one of glass fiber, porous ceramic, membrane and micro-cellulous.

5. The air dryer desiccant cartridge assembly as set forth in claim 1, wherein the rigid diffusing layer comprises at least one of a generally diamond shaped interlay, a grid structure and a structure of non-uniform geometric shapes.

6. The air dryer desiccant cartridge assembly as set forth in claim 5, wherein the rigid diffusing layer reduces at least one of aerosol and liquid oil in the compressed air during the charging cycle.

7. The air dryer desiccant cartridge assembly as set forth in claim 1, wherein during the charging cycle the rigid diffusing layer diffuses the compressed air such that the compressed air is substantially evenly distributed as the compressed air enters the desiccant.

8. The air dryer desiccant cartridge assembly as set forth in claim 1, wherein the filtering portion has an overall thickness between about 1.4 and 1.6 inches.

9. The air dryer desiccant cartridge assembly as set forth in claim 8, wherein the filtering portion has an overall thickness of 1.5 inches.

10. The air dryer desiccant cartridge assembly as set forth in claim 1, wherein the compression of the filtering portion and the desiccant is between 20 and 30 pounds per square foot.

11. The air dryer desiccant cartridge assembly as set forth in claim 10, wherein the compression of the filtering portion is approximately 25 pounds per square foot.

12. An air dryer comprising:
   a) an end cover comprising:
      i) a supply port for receiving compressed air; and
      ii) a delivery port for delivering compressed air;
   b) an outer shell attached to the end cover and defining a purge volume;
   c) a cartridge assembly located generally centrally within the purge volume, a body of the cartridge assembly including an inlet in a first end and an outlet in an opposite second end, the desiccant cartridge assembly communicating with the supply port through the inlet in the first end and communicating with the purge volume through the outlet in the second end, the cartridge assembly further comprising:
      i) a rigid porous layer adjacent to the inlet in the first end;
      ii) a fibrous material layer adjacent to the rigid porous layer;
      iii) a rigid diffusing layer adjacent to the fibrous material layer; wherein the rigid porous layer, the fibrous material layer, and the rigid diffusing layer are held together as a single assembly by at least two staples, the prongs of the at least two staples generally radially inserted into the rigid porous layer and the rigid diffusing layer; and
      iv) a desiccant positioned between the rigid diffusing layer and the outlet, wherein the rigid porous layer, the fibrous material layer, the rigid diffusing layer and the desiccant are under compression; and wherein during a charging cycle compressed air enters through the inlet in the first end and passes sequentially through the rigid porous layer, the fibrous material layer, the rigid diffusing layer and the desiccant before exiting through the outlet through the purge volume to the delivery port.

13. The air dryer as set forth in claim 12, wherein the rigid porous layer is a material comprising at least one of crushed aluminum, ceramic, cellular plastic, expanded metal foil, coarse fiber, felt and alumina ball.

14. The air dryer as set forth in claim 12, wherein the fibrous material layer is a material comprising at least one of glass fiber, porous ceramic, membrane and micro-cellulous.

15. The air dryer as set forth in claim 12, wherein the rigid diffusing layer comprises at least one of a generally diamond shaped interlay, a grid structure and a structure of non-uniform geometric shapes.

16. The air dryer as set forth in claim 12, wherein the rigid porous layer, the fibrous material layer and the rigid diffusing layer have an overall thickness between about 1.4 and 1.6 inches.

17. The air dryer as set forth in claim 16, wherein the rigid porous layer, the fibrous material layer and the rigid diffusing layer have an overall thickness of 1.5 inches.

18. The air dryer as set forth in claim 12, wherein the compression of the rigid porous layer, the fibrous material layer, the rigid diffusing layer and the desiccant is between 20 and 30 pounds per square foot.

19. The air dryer as set forth in claim 18, wherein the compression of the rigid porous layer, the fibrous material layer, the rigid diffusing layer and the desiccant is approximately 25 pounds per square foot.

20. An air dryer desiccant cartridge assembly comprising:
  a) a body including an inlet in a first end and an outlet in an opposite second end;
  b) a filtering portion in the body adjacent to the inlet for receiving compressed air during a charge cycle, comprising:
    i) a means for separating oil from the compressed air adjacent to the inlet;
    ii) a means for agglomerating oil from the compressed air;
    iii) a means for diffusing air adjacent to a desiccant, the means for agglomerating oil being positioned between the means for separating oil and the means for diffusing air; wherein the means for separating oil, the means for agglomerating oil, and the means for diffusing air are held together as a single assembly by at least two staples, the prongs of the at least two staples generally radially inserted into the means for separating oil and the means for diffusing air; and
  c) the desiccant in the body located upstream from the filtering portion during a charging cycle and adjacent to the outlet at the second end of the body, wherein the means for separating oil, the means for agglomerating oil, the means for diffusing air and the desiccant are under compression.

21. The air dryer desiccant cartridge assembly as set forth in claim 20, wherein the means for separating oil is a material comprising at least one of crushed aluminum, ceramic, cellular plastic, expanded metal foil, coarse fiber, felt and alumina ball.

22. The air dryer desiccant cartridge assembly as set forth in claim 20, wherein the means for agglomerating oil is a material comprising at least one of glass fiber, porous ceramic, membrane and micro-cellulous.

23. The air dryer desiccant cartridge assembly as set forth in claim 20, wherein the means for diffusing air comprises at least one of a generally diamond shaped interlay, a grid structure and a structure of non-uniform geometric shapes.

24. The air dryer desiccant cartridge as set forth in claim 20, wherein the compression of the means for separating oil, the means for agglomerating oil, the means for diffusing air and the desiccant is between 20 and 30 pounds per square foot.

* * * * *